US010474473B2

United States Patent
Rothman et al.

(10) Patent No.: US 10,474,473 B2
(45) Date of Patent: Nov. 12, 2019

(54) TECHNOLOGY TO FACILITATE RAPID BOOTING WITH HIGH-SPEED AND LOW-SPEED NONVOLATILE MEMORY

(71) Applicant: Intel Corporation, Santa Clara, CA (US)

(72) Inventors: Michael A. Rothman, Puyallup, WA (US); Vincent J. Zimmer, Federal Way, WA (US); Giri P. Mudusuru, Portland, OR (US); Jiewen Yao, Shanghai (CN); Jie Lin, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 148 days.

(21) Appl. No.: 15/484,513

(22) Filed: Apr. 11, 2017

(65) Prior Publication Data

US 2018/0293080 A1    Oct. 11, 2018

(51) Int. Cl.
G06F 15/177 (2006.01)
G06F 9/4401 (2018.01)
G06F 3/06 (2006.01)
G06F 21/57 (2013.01)

(52) U.S. Cl.
CPC .......... G06F 9/4406 (2013.01); G06F 3/0613 (2013.01); G06F 3/0659 (2013.01); G06F 3/0685 (2013.01); G06F 21/575 (2013.01); G06F 9/4401 (2013.01)

(58) Field of Classification Search
CPC ....... G06F 44/06; G06F 3/0613; G06F 3/0659
USPC .......................................................... 713/2
See application file for complete search history.

(56) References Cited

U.S. PATENT DOCUMENTS

| 6,385,721 B1 * | 5/2002 | Puckette | G06F 9/4408 713/2 |
| 9,195,404 B2 * | 11/2015 | Alexander | G06F 3/065 |
| 9,575,768 B1 * | 2/2017 | Kim | G06F 9/4401 |
| 2005/0060461 A1 * | 3/2005 | Yang | G06F 13/24 710/260 |

(Continued)

OTHER PUBLICATIONS

ACPI, "ACPI Overview", retrieved from http://www.acpi.info/presentations/ACPI_Overview.pdf on Mar. 2, 2017, 10 Pages.

(Continued)

*Primary Examiner* — Volvick Derose
(74) *Attorney, Agent, or Firm* — Barnes & Thornburg LLP (57) ABSTRACT

A method for booting a data processing system (DPS) involves, during a boot process of the DPS, using a preliminary bootcode module from a low-speed nonvolatile memory (NVM) in the DPS to load a main bootcode module from a high-speed NVM in the DPS into a volatile random access memory (RAM) in the DPS, wherein the high-speed NVM supports a read speed that is faster than a maximum read speed of the low-speed NVM. The method also involves, during the boot process, after loading the main bootcode module from the high-speed NVM into the RAM, using the main bootcode module to boot the DPS to an operating system (OS). The method may also involve using the preliminary bootcode module to automatically determine whether the main bootcode module from the high-speed NVM has good integrity. Other embodiments are described and claimed.

21 Claims, 5 Drawing Sheets

(56) References Cited

U.S. PATENT DOCUMENTS

| | | | | |
|---|---|---|---|---|
| 2006/0093363 | A1* | 5/2006 | Dybsetter | G06F 9/4401 398/135 |
| 2007/0028082 | A1* | 2/2007 | Lien | G06F 9/441 713/1 |
| 2008/0082808 | A1* | 4/2008 | Rothman | G06F 9/4401 713/1 |
| 2008/0301397 | A1* | 12/2008 | Goh | G06F 12/0246 711/202 |
| 2009/0113196 | A1* | 4/2009 | Jan | G06F 8/654 713/2 |
| 2010/0057960 | A1* | 3/2010 | Renno | G06F 12/1433 710/110 |
| 2010/0058045 | A1* | 3/2010 | Borras | G06F 9/4401 713/2 |
| 2010/0211766 | A1* | 8/2010 | Lee | G06F 12/0246 713/2 |
| 2011/0154006 | A1* | 6/2011 | Natu | G06F 21/575 713/2 |
| 2012/0303942 | A1* | 11/2012 | Peacock | G06F 9/4401 713/2 |
| 2014/0082262 | A1* | 3/2014 | Nachimuthu | G06F 12/00 711/103 |
| 2014/0250295 | A1* | 9/2014 | Briden | G06F 12/0246 713/2 |
| 2014/0372670 | A1* | 12/2014 | Vasilyuk | G06F 12/0246 711/103 |
| 2015/0006805 | A1* | 1/2015 | Feekes | G06F 12/08 711/105 |
| 2015/0026538 | A1* | 1/2015 | Sakai | G06F 11/1048 714/764 |
| 2015/0095600 | A1* | 4/2015 | Bahnsen | G06F 9/466 711/163 |
| 2015/0154125 | A1* | 6/2015 | Ishii | G06F 11/1048 714/768 |
| 2015/0324137 | A1* | 11/2015 | Wu | G06F 3/0619 713/2 |
| 2016/0077911 | A1* | 3/2016 | Malshe | G06F 11/1068 714/773 |
| 2017/0109531 | A1* | 4/2017 | Wang | G06F 21/572 |
| 2017/0109533 | A1* | 4/2017 | Shah | H04L 9/3236 |
| 2018/0165100 | A1* | 6/2018 | Natu | G06F 9/4406 |

OTHER PUBLICATIONS

Doran, et al., "UEFI Boot Time Optimization Under Microsoft* Windows 7*", IDF 2009 Intel Developer Forum, 2009, 34 Pages.

Intel Corporation, "Intel and Micron Produce Breakthrough Memory Technology", Business Wire, retrieved from <http://www.businesswire.com/news/home/20150728005534/en/Intel-Micron-Produce-Breakthrough-Memory-Technology> on Mar. 5, 2017, 5 Pages.

Intel Corporation, "Intel® Hardware-based Security Technologies for Intelligent Retail Devices", White Paper, 4th Generation Intel® Core™ Processors, 2013, 6 Pages.

Intel Corporation, "Next Generation Transportation", retrieved from <http://www.intel.com/content/www/us/en/automotive/automotive-overview.html> on Jan. 24, 2017, 7 Pages.

Intel Corporation, "Next Generation Transportation: Welcome to the Future of Driving", retrieved from <http://www.intel.com/content/www/us/en/automotive/automotive-overview.html> on Mar. 2, 2017, 7 Pages.

Intel Corporation, "Experience Amazing Computer Responsiveness", Product Overview: Intel® Optane™ Memory, 2017, 3 Pages.

Intel Corporation, "Intel Optane Memory: Optimize Your PC Performance", retrieved from <http://www.intel.com/content/www/us/en/architecture-and-technology/optane-memory.html> on Feb. 14, 2017, 5 Pages.

Intel Corporation, "Intel Optane Technology: Revolutionary Memory Technology", retrieved from <http://www.intel.com/content/www/us/en/architecture-and-technology/intel-optane-technology.html> on Feb. 14, 2017, 7 Pages.

Intel Corporation, "Minimal Intel Architecture Boot Loader", Jan. 2010, 26 Pages.

Intel Corporation, "Pre-EFI (PEI) Technical Overview", UEFI Training 2009, 2009, 60 Pages.

Boyd, James A., "Serial ATA Advanced Host Controller Interface (AHCI) 1.3", Serial ATA AHCI 1.3 Specification, Jun. 26, 2008, 131 Pages.

Intel Developer Zone, "S0ix States", retrieved from <https://software.intel.com/en-us/node/544551> on Mar. 2, 2017, 2 Pages.

NVM Express, Inc., "NVM Express™", Revision 1.2a, Oct. 23, 2015, 209 Pages.

Parrish, Kevin, "Intel Says Kaby Lake, Apollo Lake, and Optane Are on Track During Computex 2016", retrieved from <http://www.digitaltrends.com/computing/intel-computex-2016/>, May 31, 2016, 3 Pages.

Shah, Agam, "Intel's Optane: What users can expect in PCs and when it will ship", retrieved from <http://www.pcworld.com/article/3155365/storage/intels-optane-what-users-can-expect-in-pcs-and-when-it-will-ship.html> on Feb. 14, 2017, 4 Pages.

Wikipedia, "3D XPoint", retrieved from <https://en.wikipedia.org/wiki/3D_XPoint> on Feb. 14, 2017, 3 Pages.

Wikipedia, "Advanced Configuration and Power Interface", retrieved from <https://en.wikipedia.org/wiki/Advanced_Configuration_and_Power_Interface> on Mar. 2, 2017, 7 Pages.

Wikipedia, "Microcode", retrieved from <https://en.wikipedia.org/wiki/Microcode> on Feb. 14, 2017, 12 Pages.

Wikipedia, "NVM Express", retrieved from <https://en.wikipedia.org/wiki/NVM_Express> on Apr. 11, 2017, 8 Pages.

Wikipedia, "Serial Peripheral Interface Bus", retrieved from <https://en.wikipedia.org/wiki/Serial_Peripheral_Interface_Bus> on Mar. 4, 2017, 18 Pages.

Wikipedia, "Solid-State Drive", retrieved from <https://en.wikipedia.org/wiki/Solid-state_drive> on Mar. 4, 2017, 29 Pages.

* cited by examiner

TECHNOLOGY TO FACILITATE RAPID BOOTING WITH HIGH-SPEED AND LOW-SPEED NONVOLATILE MEMORY

TECHNICAL FIELD

This disclosure pertains in general to technology for booting data processing systems. In particular, this disclosure pertains to methods and apparatus to use high-speed nonvolatile memory (NVM) and low-speed NVM to facilitate rapid booting.

BACKGROUND

A data processing system (DPS) may include hardware and software components. The software components may include one or more applications, an operating system (OS), and firmware. The applications may include control logic for performing the work that is of value to the user of the DPS. In such a DPS, the applications run on top of the OS, which runs at a lower logical level than the applications (i.e., closer to the hardware) to provide an underlying environment or abstraction layer which makes it easier to create and execute the applications. The firmware runs at an even lower logical level, to provide an underlying environment or abstraction layer which makes it easier to create and execute the OS. For instance, the firmware may establish a basic input/output system (BIOS), and the OS may use that BIOS to communicate with different hardware components within the DPS.

Typically, the OS and the applications execute out of random-access memory (RAM), which is volatile. Some or all of the firmware may also execute out of RAM. However, since the RAM is volatile, the environment for performing useful work basically disappears whenever the DPS is turned off. Consequently, whenever the DPS is turned on, the DPS must recreate that environment before useful work can be performed. For purposes of this disclosure, the operations for preparing a DPS to execute an OS may be referred to as the "boot process." Similarly, the time that elapses during the boot process may be referred to as the "boot time."

DESCRIPTION OF EMBODIMENTS

As indicated above, when a DPS is turned on or reset, the DPS may need to execute a boot process before the DPS can be utilized for useful work. The control logic or firmware which performs or controls the boot process may be referred to as the "system firmware," the "system bootcode," the "platform bootcode," or simply the "bootcode." A DPS may store the bootcode in an NVM. As part of the process for preparing the computer to execute the OS, the bootcode may discover and initialize hardware resources in the computer, such as the RAM. Before the bootcode initializes the RAM, a processor in the DPS may use techniques such as execution-in-place (XIP) and cache-as-RAM to execute the bootcode. After the RAM has been initialized, the processor may copy some or all of the bootcode into the RAM from the NVM. The processor may then execute the bootcode from RAM to complete the boot process.

Part of that boot process may include discovering peripheral devices and loading peripheral firmware from those peripheral devices into RAM. A peripheral device may store its peripheral firmware in a read-only memory (ROM), for example. Accordingly, for purposes of this disclosure, peripheral firmware may be referred to in general as "option ROM firmware."

Thus, the system firmware may use option ROM firmware. For purposes of this disclosure, terms like "system firmware," "system bootcode," "platform bootcode," and "bootcode" should be understood as denoting the system firmware, and as not including option ROM firmware or other types of peripheral firmware.

The time required to execute the boot process may be substantial. Consequently, to avoid the delay presented by the boot process, a user may decide against turning off his or her DPS in the first place. The energy that is consumed by a DPS while the DPS is on but not being used may be considered wasted energy. Fortunately, a DPS may be configured to enter a low-power state in response to a predetermined period of inactivity, or in response to manual selection of a low-power state. However, low-power states still consume more energy than an off state. Moreover, some energy consuming practices may violate energy mandates promulgated by organizations such as the California Energy Commission.

Additionally, some data processing systems are used for purposes that cannot tolerate a lengthy delay between power on and useful work. For instance, a DPS used in the automotive or transportation sector may be required to transfer control to its OS in less than 700 milliseconds (ms).

In a typical DPS, the NVM for the bootcode uses NOR flash memory to store data and a serial peripheral interface (SPI) for input and output. Consequently, the NVM is relatively slow. A significant portion of the boot time may therefore be attributable to reading the bootcode from the NVM.

The present disclosure describes a DPS with at least two different types of NVM, including a low-speed NVM and a high-speed NVM. In addition, the present disclosure describes bootcode that is split into two or more different portions or modules, and at least one of those portions is stored in the high-speed NVM. Typically, when the DPS boots, instead of reading all of the bootcode from the low-speed NVM, the DPS reads at least some of the bootcode from the high-speed NVM. In addition, the DPS may take steps to validate the bootcode from the high-speed NVM before executing that bootcode. Despite the extra operations for validation and for other actions associated with using more than one NVM, the overall boot time may be substantially reduced, relative to a conventional DPS with all of the bootcode in a low-speed NVM. In addition, as described in greater detail below, the hardware costs for a DPS according to the present disclosure may be reduced, relative to a conventional DPS with a low-speed NVM that is large enough to hold all of the bootcode.

Figure 1:
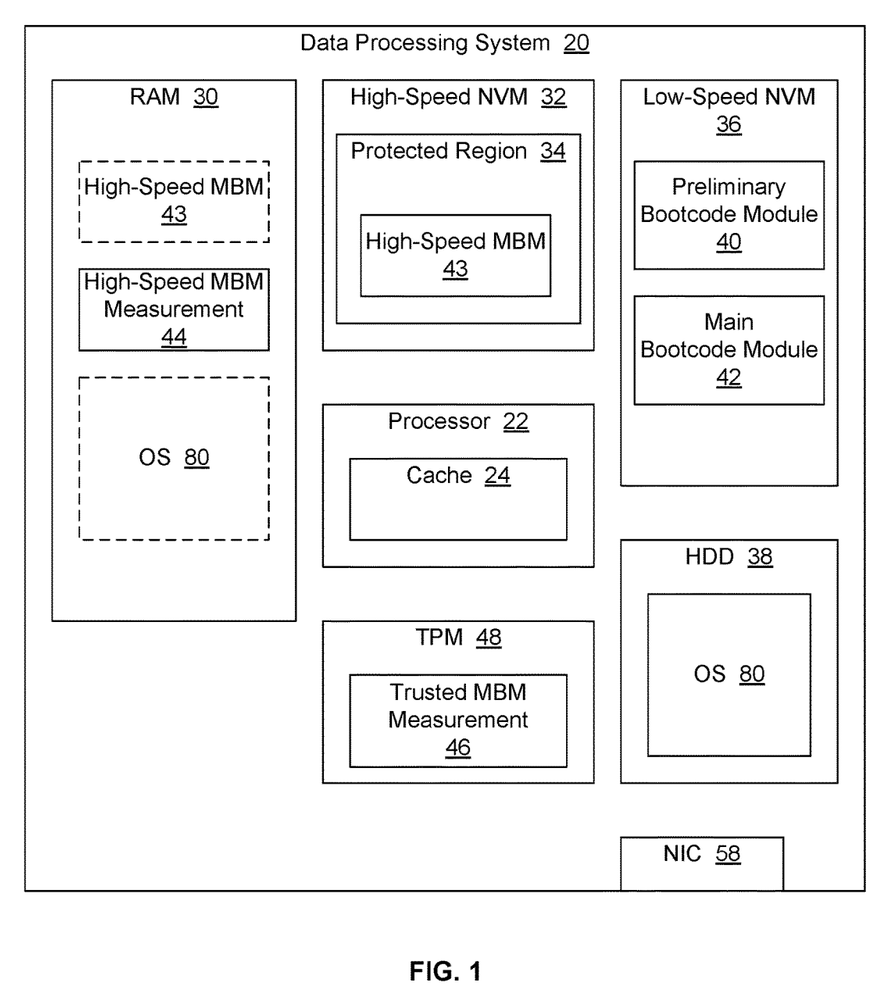
FIG. 1 is a block diagram of an example embodiment of a data processing system that uses a high-speed NVM and a relatively large low-speed NVM to facilitate rapid booting.

FIG. 1 is a block diagram of an example embodiment of a DPS 20 that uses a high-speed NVM 32 and a low-speed NVM 36 to facilitate rapid booting. In the embodiment of FIG. 1, low-speed NVM 36 is large, relative to the low-speed NVM in the embodiment of FIG. 2.

As illustrated, DPS 20 also includes at least one processor 22 in communication with other hardware components such as high-speed NVM 32, low-speed NVM 36, a RAM 30, a network interface controller (NIC) 58, and a trusted platform module (TPM) 48. Processor 22 may include one or more levels of cache 24. Processor 22 may also be referred to as a "central processing unit" (CPU), and some embodiments may include multiple CPUs. Processor 22 may also be communicatively coupled to one or more nonvolatile mass storage devices, such as a solid-state drive (SSD) or a hard disk drive (HDD) 38.

As indicated below, some types of NVM are faster than others. For purposes of this disclosure, the term "read speed" is used to describe how much data can be read from an NVM in a certain amount of time. Accordingly, read speed may be expressed in terms of megabytes per second (MB/s), for instance. Read speed may also be referred to as "average read speed," "maximum read speed," or simply "speed." Also, an NVM that is capable of delivering a particular read speed may be said to "support" that speed. Thus, in a given embodiment, the high-speed NVM supports a higher read speed than the low-speed NVM. In other words, the high-speed NVM supports a read speed that is faster than the maximum supported read speed of the low-speed NVM. Or more simply, the high-speed NVM has a higher read speed. For purposes of this disclosure, the "maximum supported read speed" or "maximum read speed" of an NVM is the fastest average read speed that the NVM is capable of delivering.

Figure 2:
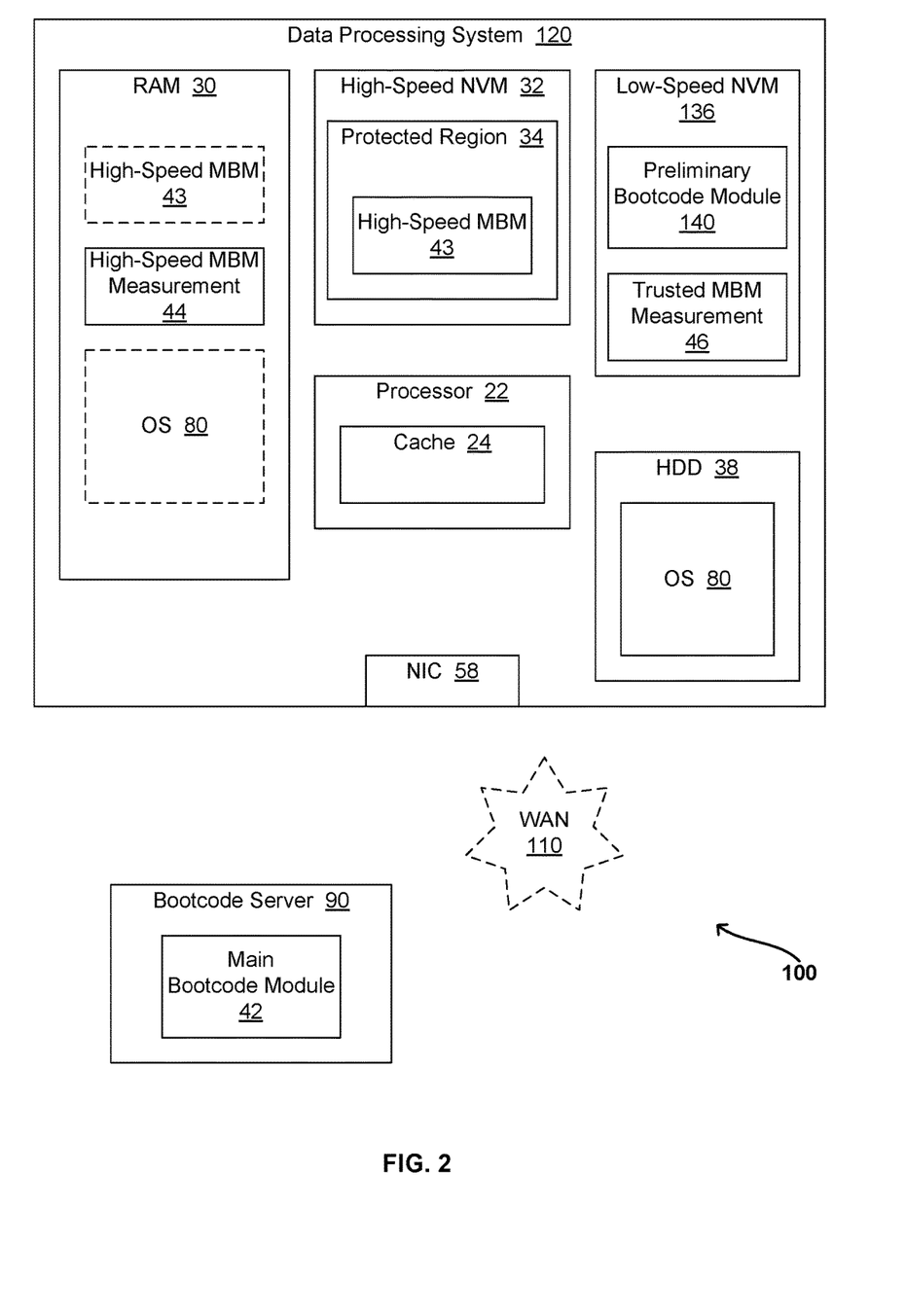
FIG. 2 is a block diagram of an example embodiment of a data processing system that uses a high-speed NVM and a relatively small low-speed NVM to facilitate rapid booting.

In the embodiments of FIGS. 1 and 2, the low-speed NVMs may use NOR flash memory to store data, and each low-speed NVM may use an interface with a bus width of no more than four lines or wires, with only two of those lines being used to input and output data. For instance, the low-speed NVM may use an SPI, with only two data lines: a master output, slave input (MOSI) line, and a master input, slave output (MISO) line. The low-speed NVM may have a read speed of about 9.38 MB/s, using an SPI that operates at 75 megahertz (MHz). However, other embodiments may use low-speed NVMs with different speeds. For instance, one embodiment may use a low-speed NVM with a read speed of about 35 MB/s, using an SPI that operates at 280 MHz. Other embodiments may use low-speed NVMs with speeds in the range from about 9 MB/s to about 40 MB/s.

High-speed NVM 32 may use NAND memory cells that are arranged both horizontally and vertically to store data. In other words, high-speed NVM 32 may use one or more three-dimensional (3D) collections (or arrays) of memory cells to store data. Additionally, high-speed NVM 32 may use an NVM Express (NVMe) interface, a Serial AT Attachment (ATA) interface, or any other suitable bus interface to input and output data. A Serial ATA interface may also be referred to as an "SATA interface." Thus, high-speed NVM 32 may include an input/output (I/O) interface with multiple transmit lines and multiple receive lines.

In the embodiment of FIG. 1, high-speed NVM 32 has a read speed of about 1,600 MB/s. However, other embodiments may use high-speed NVMs with different speeds. For instance, one embodiment may use a high-speed NVM with a read speed of about 1,000 MB/s, and other embodiments may use high-speed NVMs with speeds in in excess of 1,000 MB/s. Some embodiments may use high-speed NVMs like those described by Intel Corporation under the name or trademark of "Intel® Optane™ Memory." Additional details on that memory technology may be found on the internet under the following universal resource locator (URL): www.intel.com--content--www--us--en--architecture-and-technology--optane-memory.html. (To prevent URLs from becoming clickable hyperlinks, this disclosure replaces each forward slash character in each URL with the string "--".) Also, as indicated at www.intel.com--content--www--us--en--architecture-and-technology--intel-optane-technology. html, the manufacture of high-speed NVM may include "slicing submicroscopic layers of materials into columns, each containing a memory cell and selector, and then connecting them with an innovative cross point structure of perpendicular wires." The memory technology for high-speed NVM may also be referred to using the name or trademark of "3D Crosspoint" or "3D XPoint." Further details may be obtained from en.wikipedia.org--wiki--3D_XPoint and from other sites, such as www.businesswire.com--news--home--20150728005534--en--Intel-Micron-Produce-Breakthrough-Memory-Technology. Accordingly, high-speed NVM 32 may have about the same effective read speed as double data rate fourth-generation synchronous dynamic RAM (DDR4 SDRAM) while having a nonvolatile characteristic. However, other embodiments may use high-speed NVM that is referred to under other names or trademarks. Nevertheless, the high-speed NVM in each embodiment may use a different interface than the low-speed NVM. Additionally, the high-speed NVM is faster than the low-speed NVM. For instance, as indicated below, the high-speed NVM may be over 20 times faster than the low-speed NVM in some embodiments. In other embodiments, the high-speed NVM may be over 150 times faster than the low-speed NVM.

HDD 38 may use one or more magnetic disks to store data, and HDD 38 may use an interface with no more than four data lines or wires. For instance, HDD 38 may use an SATA interface with two transmit lines and two receive lines. An OS 80 and one or more applications may be stored on HDD 38. Similarly, if an SSD is included, the SSD may use the same kind of interface as an HDD, such as an SATA interface.

In the embodiment of FIG. 1, the manufacturer or supplier of DPS 20 has installed a preliminary bootcode module (PBM) 40 and a main bootcode module (MBM) 42 into low-speed NVM 36. Accordingly, an instance of a main bootcode module in a low-speed NVM may be referred to as a "low-speed main bootcode module" or a "low-speed MBM." As described in greater detail below with regard to FIG. 3, preliminary bootcode module 40 may then copy low-speed MBM 42 into a protected region 34 of high-speed NVM 32. Accordingly, an instance of a main bootcode module in a high-speed NVM may be referred to as a "high-speed main bootcode module" or a "high-speed MBM." Thus, FIG. 1 shows high-speed MBM 43 in high-speed NVM 32.

During a typical boot process, processor 22 may copy some or all of high-speed MBM 43 from high-speed NVM 32 into RAM 30 for execution, and processor 22 may copy some or all of OS 80 from HDD 38 into RAM 30 for execution, as illustrated by the boxes with dashed outlines in RAM 30. In addition, as described in greater detail below with regard to FIG. 3, preliminary bootcode module 40 may (a) compute a measurement 44 of high-speed MBM 43, (b) retrieve a previously saved measurement of main bootcode module 42 from a trusted store (such as TPM 48), and (c) use those measurements to determine whether the integrity of high-speed MBM 43 has been maintained, or whether high-speed MBM 43 has been tampered with.

FIG. 2 is a block diagram of an example embodiment of a DPS 120 that uses a high-speed NVM 32 and a low-speed NVM 136 to facilitate rapid booting. In the embodiment of FIG. 2, DPS 120 may use some of the same types of components as DPS 20, as reflected in the matching reference numbers. However, in the embodiment of FIG. 2, low-speed NVM 136 is small, relative to low-speed NVM 36 in the embodiment of FIG. 1. Also, the embodiment of FIG. 2 includes a preliminary bootcode module 140 which differs from preliminary bootcode module 40 in the embodiment of FIG. 1. For instance, preliminary bootcode module 140 may include control logic for retrieving a fresh copy of main bootcode module 42 from an external source, such as bootcode server 90.

Accordingly, in the embodiment of FIG. 2, DPS 120 is part of a distributed data processing system (DDPS) 100. DPS 120 and bootcode server 90 may communicate with each other using any suitable approach or combination of approaches, including via a wide area network (WAN) 110 such as the internet, via a local area network (LAN), etc. Bootcode server 90 may be referred to as "remote" because it is external to DPS 120. Nevertheless, bootcode server 90 and DPS 120 may be located in the same facility. For instance, a DDPS may include a bootcode server and hundreds of client devices like DPS 120 operating together in a data center. Alternatively, one or more of the client devices may be located a great distance from the bootcode server.

Also, the embodiment of FIG. 2 also illustrates that DPS 120 need not include a TPM, and trusted MBM measurement 46 may be stored somewhere else instead, such as in low-speed NVM 136. For instance, preliminary bootcode module 140 may follow the Unified Extensible Firmware Interface (UEFI) specification, and preliminary bootcode module 140 may store MBM measurement 46 in protected storage in low-speed NVM 136. For example, preliminary bootcode module 140 may use protected special-purpose UEFI variables to store MBM measurement 46 and other protected data items. Additionally information about UEFI and protecting UEFI variables may be found in the UEFI specification, which may be found on the internet at www.uefi.org--specifications, with version 2.6 available at www.uefi.org--sites--default--files--resources--UEFI%20-Spec%202_6%20Errata%20A%20final.pdf.

Figure 3:
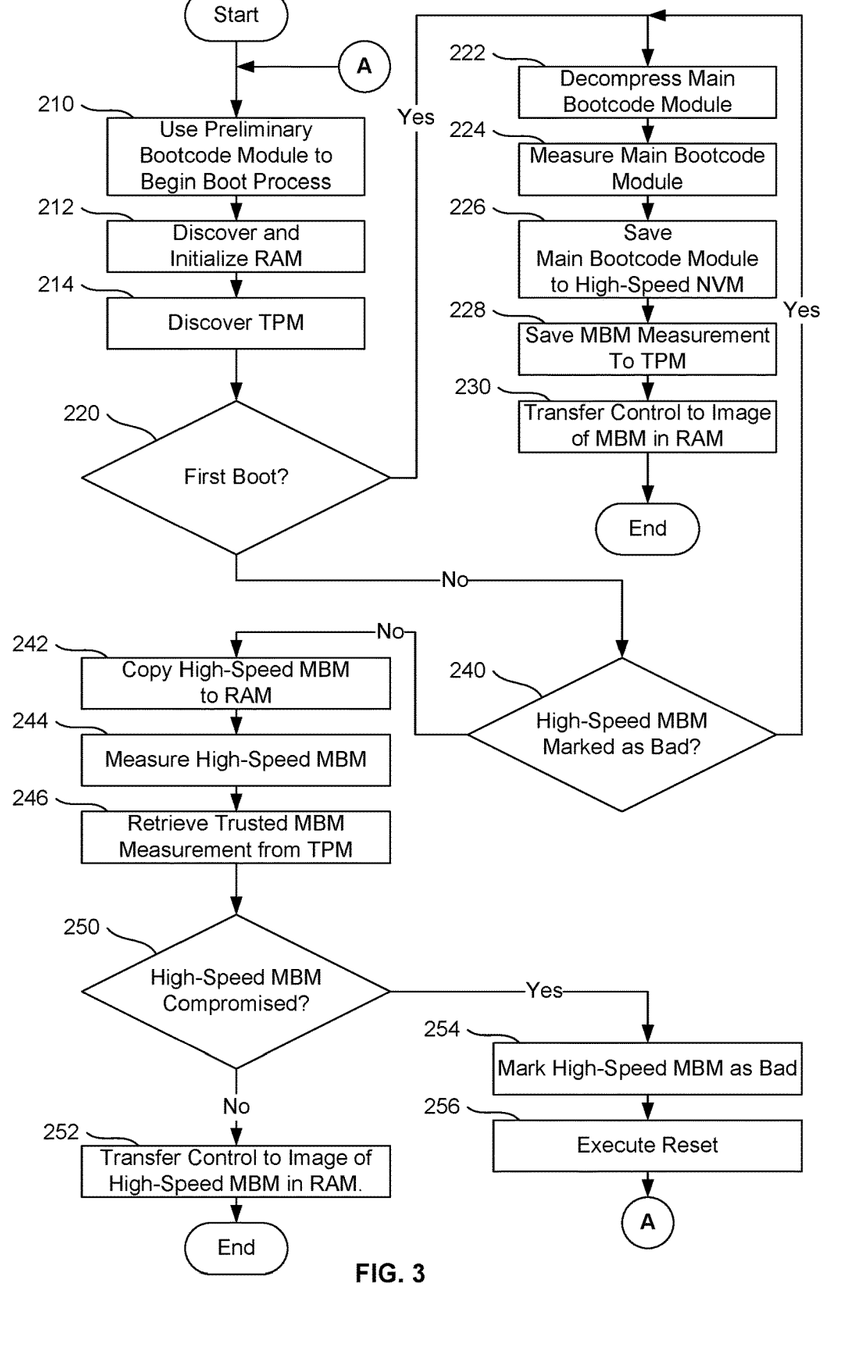
FIG. 3 presents a flowchart of an example embodiment of a process for using a high-speed NVM and a relatively large low-speed NVM to facilitate rapid booting.

FIG. 3 presents a flowchart of an example embodiment of a process for using high-speed NVM 32 and a relatively large low-speed NVM 36 to facilitate rapid booting. The process of FIG. 3 corresponds to DPS 20 in FIG. 1, with low-speed NVM 36 in FIG. 1 being larger than low-speed NVM 136 in FIG. 2 because low-speed NVM 36 is large enough to contain a copy of a main bootcode module, but low-speed NVM need not contain a copy of a main bootcode module.

DPS 20 may perform the process of FIG. 3 in response to being turned on or reset, for example. As shown at block 210, the process starts with processor 22 using preliminary bootcode module 40 to begin the boot process. For instance, processor 22 may use XIP to begin executing preliminary bootcode module 40, and processor 22 may then transition to using cache-as-RAM to execute preliminary bootcode module 40.

As shown at block 212, preliminary bootcode module 40 may discover and initialize RAM 30. For instance, preliminary bootcode module 40 may include memory initialization reference code (MRC), and preliminary bootcode module 40 may use the MRC to initialize RAM 30. Preliminary bootcode module 40 may also perform early chipset initialization. For instance, as shown at block 214, preliminary bootcode module 40 may discover TPM 48.

As shown at block 220, preliminary bootcode module 40 may then determine whether DPS 20 has ever booted before. If this is the first boot for DPS 20, preliminary bootcode module 40 may take various steps to configure DPS 20. For purposes of this disclosure, those steps may be referred to as an "initial boot process" or a "configuration boot process." For instance, as shown at block 222, preliminary bootcode module 40 may decompress main bootcode module 42 into RAM 30, and preliminary bootcode module 40 may then measure the decompressed main bootcode module, as shown at block 224. For instance, preliminary bootcode module 40 may calculate a 32-byte hash of the image. As shown at block 226, preliminary bootcode module 40 may also save the decompressed main bootcode module 42 to high-speed NVM 32, thereby creating high-speed MBM 43. In particular, as indicated above, preliminary bootcode module 40 may load high-speed MBM 43 into protected region 34. Further details on technology for preventing unauthorized access protected region 34 are provided below. Also, as shown at block 228, preliminary bootcode module 40 may complete the configuration boot process by saving MBM measurement 46 to a trusted nonvolatile store. For instance, preliminary bootcode module 40 may save MBM measurement 46 to TPM 48. Alternatively, preliminary bootcode module 40 may save MBM measurement 46 to a proprietary nonvolatile store.

As shown at block 230, preliminary bootcode module 40 may then finish executing by transferring control to the image of main bootcode module 42 in RAM 30. The process of FIG. 3 may then end, with main bootcode module 42 performing any additional steps necessary to prepare DPS 20 to boot to OS 80.

However, referring again to block 220, if preliminary bootcode module 40 determines that DPS 20 is not booting for the first time, preliminary bootcode module 40 may then determine whether high-speed MBM 43 has been marked as bad, as shown at block 240 and described in greater detail below. If high-speed MBM 43 has not been marked as bad, preliminary bootcode module 40 may copy high-speed MBM 43 from high-speed NVM 32 to RAM 30, as shown at block 242. As shown at block 244, preliminary bootcode module 40 may then measure the copy of high-speed MBM 43 in RAM 30. That measurement may be referred to as the current MBM measurement. Alternatively, preliminary bootcode module 40 may measure high-speed MBM 43 as it is being read. Also, as shown at block 246, preliminary bootcode module 40 may retrieve trusted MBM measurement 46 from TPM 48. As shown at block 250, preliminary bootcode module 40 may then use the current MBM measurement and trusted MBM measurement 46 to determine whether high-speed MBM 43 has lost integrity. For instance, the measurements may not match due to tampering, due to one or more faulty storage cells, etc. If high-speed MBM 43 has good integrity, preliminary bootcode module 40 may then finish executing by transferring control to the image of high-speed MBM 43 in RAM 30, as shown at block 252. The process of FIG. 3 may then end, with high-speed MBM 43 performing any additional steps necessary to prepare DPS 20 to boot to OS 80. For purposes of this disclosure, the steps that a preliminary bootcode module performs when the high-speed MBM has not been marked as bad and the high-speed MBM has good integrity may be referred to as a "regular boot process" or a "typical boot process."

However, referring again to block 250, if preliminary bootcode module 40 determines that high-speed MBM 43 has been compromised, preliminary bootcode module 40 may mark high-speed MBM 43 as bad, as shown at block 254. For purposes of this disclosure, the operations for recovering from a compromised high-speed MBM may be referred to collectively as a "recovery boot process." Preliminary bootcode module 40 may use any suitable technique to mark high-speed MBM 43 as bad. For instance, preliminary bootcode module 40 may use a special UEFI variable as a flag to inform the execution path when the reset occurs. As shown at block 256, preliminary bootcode module 40 may then execute a reset operation, thereby causing the process to return to block 210 via page connector A.

Preliminary bootcode module 40 may then perform steps 210-220 and 240 as indicated above. Now, however, preliminary bootcode module 40 may determine at block 240 that high-speed MBM 43 has been marked as bad. Consequently, the process may proceed to block 222 with preliminary bootcode module 40 getting a fresh copy of main bootcode module 42 from low-speed NVM 36. To complete the recovery boot process, preliminary bootcode module 40 may then use that main bootcode module 42 to refresh the image in high-speed NVM 32, as described above with regard to blocks 222-228. However, in some embodiments, during the recovery boot process, preliminary bootcode module may skip the steps for measuring the main bootcode module (224) and saving that measurement (228).

During a typical boot process with a trustworthy copy of main bootcode module 42 in high-speed NVM 32, DPS 20 may load high-speed MBM 43 into RAM much more quickly than would be possible if all of the bootcode had to come from low-speed NVM 36. The following table illustrates some example approximate load times for four different systems, with each system having a main bootcode module (or a comparable portion of a monolithic bootcode module) that is 7 MB large.

| Read Speed | Load Time |
| --- | --- |
| Low-speed NVM @ 9.375 MB/s | 746 ms |
| Low-speed NVM @ 35 MB/s | 200 ms |
| High-speed NVM @ 1,000 MB/s | 7 ms |
| High-speed NVM @ 1,600 MB/s | 4.3 ms |

Thus, high-speed NVM at 1,000 MB/s is 28 times faster than low-speed NVM at 35 MB/s. And high-speed NVM at 1,600 MB/is 173 times faster than low-speed NVM at 9.375 MB/s. Consequently, a DPS using high-speed NVM at 1,000 MB/s may finish loading 7 MB of bootcode in 7 ms, compared to 200 ms for a DPS using low-speed NVM at 35 MB/s. And a DPS using high-speed NVM at 1,600 MB/s may finish in 4.3 ms, compared to 746 ms for a DPS using low-speed NVM at 9.375 MB/s. Thus, a DPS may save a minimum of (200−7=) 193 ms and a maximum of (746−4.3=) 741.7 ms, in the four examples illustrated above. Different levels of relative improvement may be realized in different embodiments.

This disclosure may use terms such as a "particular boot process," a "single boot process," and the like. Such terms are intended to refer to the boot operations performed to boot to an OS after the DPS has been turned on or reset to initiate the boot process. For instance, with regard to FIG. 3, for the first boot of a DPS, that particular boot process may start with block 210 and end with block 230. Similarly, a single boot process for a regular boot or typical boot may start with block 210 and end with block 252. However, a single boot process may include intermediate reset and recovery operation. For example, a single boot process involving a compromised high-speed MBM may start with block 210, continue through block 256 back to block 210, and end with block 230.

Figure 4A:
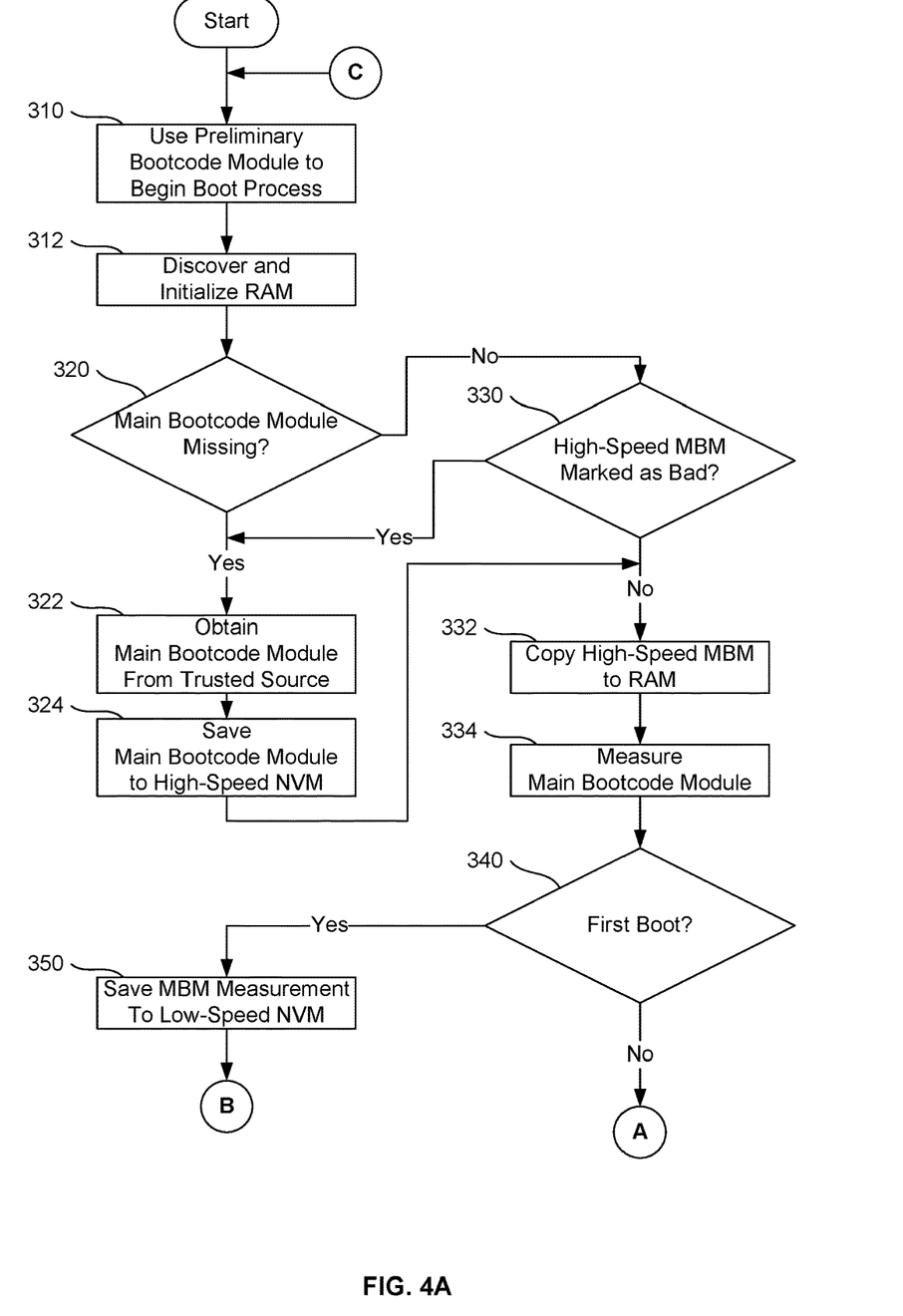
FIGS. 4A and 4B present a flowchart of an example embodiment of a process for using a high-speed NVM and a relatively small low-speed NVM to facilitate rapid booting.
Figure 4B:
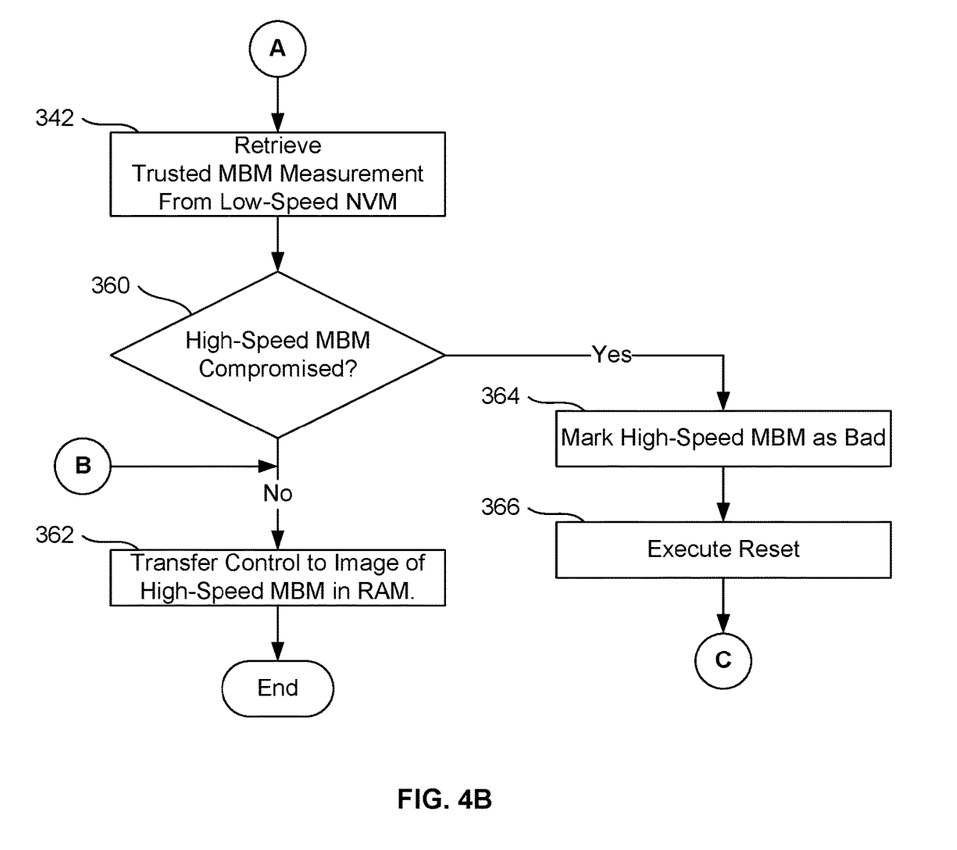

FIGS. 4A and 4B present a flowchart of an example embodiment of a process for using high-speed NVM 32 and a relatively small low-speed NVM 136 to facilitate rapid booting. The process of FIGS. 4A and 4B corresponds to DPS 120 in FIG. 2, with low-speed NVM 136 in FIG. 2 being smaller than low-speed NVM 36 in FIG. 1 because low-speed NVM 136 need not contain a copy of a main bootcode module. Instead, as described in greater detail below, when DPS 120 needs a copy of a main bootcode module, DPS 120 gets that copy either from high-speed NVM 32 or from a source other than low-speed NVM 136.

DPS 120 may perform the process of FIGS. 4A and 4B in response to being turned on or reset, for example. As shown at block 310, the process starts with processor 22 using preliminary bootcode module 140 to begin the boot process. When performing operations like those described above with regard to FIG. 3, preliminary bootcode module 140 may use techniques that are the same as or similar to those described above with regard to preliminary bootcode module 40. For instance, processor 22 may use XIP to begin executing preliminary bootcode module 140, and processor 22 may then transition to using cache-as-RAM to execute preliminary bootcode module 140.

As shown at block 312, preliminary bootcode module 140 may discover and initialize RAM 30. For instance, preliminary bootcode module 140 may include MRC that preliminary bootcode module 140 uses to initialize RAM 30. Also, preliminary bootcode module 140 may perform early chipset initialization. As shown at block 320, preliminary bootcode module 140 may then determine whether high-speed NVM 32 contains a main bootcode module (e.g., high-speed MBM 43). If the main bootcode module is missing from high-speed NVM 32, preliminary bootcode module may obtain the main bootcode module from a trusted source, as shown at block 322. For example, preliminary bootcode module 140 may obtain a copy of main bootcode module 42 from bootcode server 90. Alternatively, preliminary bootcode module 140 may obtain the main bootcode module from a flash drive connected to DPS 120. For instance, DPS 120 may prompt the user to insert a flash drive with a main bootcode module into a universal serial bus (USB) port of DPS 120.

Sources such as the flash drive and remote server 90 may be considered trusted by virtue of a digital signature or any other suitable technique. For example, the original equipment manufacturer (OEM) that assembled DPS 12 may digitally sign main bootcode module 42 before main bootcode module 42 is saved to remote server 90 or to the flash drive. Accordingly, preliminary bootcode module 140 may use that signature to verify that main bootcode module 42 is authentic when preliminary bootcode module 42 retrieves main bootcode module 42 from remote server 90 or from the flash drive.

Alternatively, preliminary bootcode module may obtain the main bootcode module from any another suitable source. As shown at block 324, preliminary bootcode module 140 may then save a copy of the main bootcode module to protected region 43 in high-speed NVM 32, thereby creating high-speed MBM 43.

However, at block 320, if preliminary bootcode module 140 determines that high-speed NVM 32 already contains high-speed MBM 43, preliminary bootcode module 140 may then determine whether high-speed MBM 43 has been marked as bad, as shown at block 330. If high-speed MBM 43 has been marked as bad, preliminary bootcode module may obtain a fresh copy of the main bootcode module from a trusted source and save that copy to high-speed NVM 32, as shown at blocks 322 and 324.

The process may then pass from block 324 to block 332, which depicts preliminary bootcode module 140 loading high-speed MBM 43 into RAM 30, as shown at block 332. And as shown at block 334, preliminary bootcode module may then compute a measurement 44 of high-speed MBM 43. That measurement may be referred to as the current MBM measurement.

As shown at block 340, preliminary bootcode module 140 may then determine whether DPS 120 has ever booted before. If this is not the first boot for DPS 120, the process may then pass through page connector A to FIG. 4B. If this is the first boot for DPS 120, preliminary bootcode module 140 may save MBM measurement 46 to low-speed NVM 136, as shown at block 350. The process may then pass through page connector B to FIG. 4B. After passing through page connector B due to a positive first-boot determination, preliminary bootcode module 140 may then finish executing by transferring control to the image of high-speed MBM 43 in RAM 30. The process of FIG. 4B may then end, with high-speed MBM 43 performing any additional steps necessary to prepare DPS 120 to boot to OS 80.

However, after passing through page connector A due to a negative first-boot determination, preliminary bootcode module 140 may then retrieve trusted MBM measurement 46 from low-speed NVM 136, as shown at block 342. As shown at block 360, preliminary bootcode module 140 may then use the current MBM measurement and trusted MBM measurement 46 to determine whether high-speed MBM 43 has been compromised. If high-speed MBM 43 has not been compromised, preliminary bootcode module 140 may then finish executing by transferring control to the image of high-speed MBM 43 in RAM 30, as shown at block 362. The process of FIG. 4B may then end, with high-speed MBM 43 performing any additional steps necessary to prepare DPS 20 to boot to OS 80.

However, referring again to block 360, if preliminary bootcode module 140 determines that high-speed MBM 43 has been compromised, preliminary bootcode module 140 may mark high-speed MBM 43 as bad, as shown at block 364. As shown at block 366, preliminary bootcode module 140 may then execute a reset operation, thereby causing the process to return to block 310 via page connector C.

Preliminary bootcode module 140 may then perform steps 310-320 and 330 as indicated above. However, at block 330 preliminary bootcode module 40 will determine that high-speed MBM 43 has been marked as bad. Consequently, the process will proceed to block 332 with preliminary bootcode module 140 getting a fresh copy of main bootcode module 42 from a trusted source, as indicated above.

Also, as indicated above, a high-speed MBM may be stored in a protected region of a high-speed NVM. For instance, DPS 20 and DPS 120 may include technology to secure protected region 34 against unauthorized access. For instance, DPS 20 (and DPS 120) may only allow protected region 34 to be accessed from a trusted execution environment (TEE). Additionally, the security technology may prevent software outside of the TEE from accessing data in the TEE. A TEE may thus provide an isolated execution environment. In one embodiment, to create and utilize a TEE, a device may use the technology provided by Intel Corporation under the name or trademark "Intel® Software Guard Extensions" or "Intel® SGX." In another embodiment, to create and utilize a TEE, a device may use the technology provided by ARM Ltd. under the name or trademark "ARM TrustZone." In other embodiments, devices may use alternative technologies to create and utilize TEEs. In the embodiments of FIGS. 1 and 2, protected region 34 is a dedicated, tamper-resistant portion of high-speed NVM 32 that is only accessible to software executing in the TEE of the platform. Protected region 34 can be provisioned with appropriate security policies during the manufacturing process. In other embodiments, DPSs may use other techniques to secure protected regions of high-speed NVM from unauthorized access.

As has been described, the bootcode for a DPS may be split into a preliminary bootcode module and a main bootcode module, and the main bootcode module may be stored in high-speed NVM, to facilitate a boot process that is significantly faster than the boot process of a DPS that stores all of the bootcode in low-speed NVM. Moreover, it may be less expensive to produce the motherboard for a DPS that boots using high-speed NVM, compared to a motherboard that needs a larger low-speed NVM to accommodate all of the bootcode. In other words, the motherboard for the DPS that boots using high-speed NVM may benefit from a reduced bill of materials (BOM)—in addition to reduced boot times.

In some embodiments, a high-speed MBM may allow the pre-OS firmware to replay audio streams, to present or post graphics images, and to provide other advanced output capabilities during the initial boot of the DPS. The initial boot may also be referred to as a training boot. Data for the advanced output capabilities may also be stored in the high-speed NVM. Such output capabilities may satisfy user interface requirements associated with certain applications, such as applications for autonomous vehicles and other vehicular systems.

Additionally, a DPS may realize some or all of the benefits described herein while also realizing reduced energy consumption, relative to a conventional DPS.

In light of the principles and example embodiments described and illustrated herein, it will be recognized that the illustrated embodiments can be modified in arrangement and detail without departing from such principles. Also, even though expressions such as "an embodiment," "one embodiment," "another embodiment," or the like are used herein, these phrases are meant to generally reference embodiment possibilities, and are not intended to limit the invention to particular embodiment configurations. As used herein, these phrases may reference the same embodiment or different embodiments, and those embodiments are combinable into other embodiments.

For instance, a TPM may be added to the embodiment of FIG. 2, and control logic for obtaining a main bootcode module from an external source may be added to the preliminary bootcode module in the embodiment of FIG. 1. Also, block 250 of FIG. 3 and block 360 of FIG. 4B pertain to determinations of whether a high-speed MBM has been compromised. Such operations may be utilized in an embodiment with a high-speed NVM that is not lockable, such as an embodiment where the high-speed NVM has no protected region. In other embodiments, other techniques may be used for tamper prevention or detection, in addition to or in place of the operations described above. For instance, a DPS may include the security technologies provided by Intel Corporation under the names or trademarks of "Intel® Platform Trust Technology (PTT)" and "Intel® Platform Protection Technology with Boot Guard." The Boot Guard technology may provide for secure boot, based on an authenticated code module (ACM). The ACM may perform one or more integrity checks to verify that known and trusted firmware is booting the platform. Another embodiment may feature high-speed NVM that is lockable to prevent tampering with the boot image. The preliminary bootcode module may therefore omit the integrity check.

Also, this disclosure may refer to instructions, functions, procedures, data structures, application programs, microcode, configuration settings, and other kinds of data. As described above, when the data is accessed by a machine or device, the machine or device may respond by performing tasks, defining abstract data types or low-level hardware contexts, and/or performing other operations. For instance, data storage, RAM, and/or flash memory may include various sets of instructions which, when executed, perform various operations. Such sets of instructions may be referred to in general as software. And software that is used during the boot process may be referred to as firmware, as indicated above. Software that is stored in nonvolatile memory may also be referred to as firmware. In addition, terms like "program" and "module" may be used in general to cover a broad range of software constructs, including applications, routines, drivers, subprograms, processes, and other types of software components. Any suitable operating environment and programming language (or combination of operating environments and programming languages) may be used to implement software components described herein.

Alternative embodiments include machine-accessible media encoding instructions or control logic for performing the operations described herein. Such embodiments may also be referred to as program products. Such machine-accessible media may include, without limitation, tangible storage media such as magnetic disks, optical disks, RAM, ROM, etc., as well as processors, controllers, and other components that include RAM, ROM, and/or other storage facilities. For purposes of this disclosure, the term "ROM" may be used in general to refer to nonvolatile memory devices such as erasable programmable ROM (EPROM), electrically erasable programmable ROM (EEPROM), flash ROM, flash memory, etc.

It should also be understood that the hardware and software components depicted herein represent functional elements that are reasonably self-contained so that each can be designed, constructed, or updated substantially independently of the others. In alternative embodiments, many of the components may be implemented as hardware, software, or combinations of hardware and software for providing the functionality described and illustrated herein. In some embodiments, some or all of the control logic for implementing the described operations may be implemented in hardware logic (e.g., as part of an integrated circuit chip, a programmable gate array (PGA), an application-specific integrated circuit (ASIC), etc.).

Also, it should be understood that any particular software module may include more than one component. For instance, a main bootcode module may include two or more components, and those components may cooperate to complete the operations of the main bootcode module, such as booting to an OS.

Similarly, instructions for multiple components may be stored in one non-transitory machine accessible medium. In at least one other embodiment, two or more non-transitory machine-accessible media may be used for storing the instructions for the relevant components. For instance, instructions for one component may be stored in one medium, and instructions another component may be stored in another medium. Alternatively, a portion of the instructions for one component may be stored in one medium, and the rest of the instructions for that component (as well instructions for other components), may be stored in one or more other media. Instructions may also be used in a distributed environment, and may be stored locally and/or remotely for access by single or multi-processor machines.

Similarly, applications and/or other data that are described above as residing on a particular device in one example embodiment may, in other embodiments, reside on one or more other devices. And computing operations that are described above as being performed on one particular device in one example embodiment may, in other embodiments, be executed by one or more other devices.

The present teachings may be used to advantage in many different kinds of data processing systems. Example data processing systems may include, without limitation, systems on a chip (SOCs), wearable devices, handheld devices, smartphones, telephones, entertainment devices such as audio devices, video devices, audio/video devices (e.g., televisions and set top boxes), vehicular processing systems, personal digital assistants (PDAs), tablet computers, laptop computers, portable computers, personal computers (PCs), workstations, servers, client-server systems, distributed computing systems, supercomputers, high-performance computing systems, computing clusters, mainframe computers, mini-computers, and other devices for processing or transmitting information. Accordingly, unless explicitly specified otherwise or required by the context, references to any particular type of data processing system (e.g., a PC) should be understood as encompassing other types of data processing systems, as well. Also, unless expressly specified otherwise, components that are described as being coupled to each other, in communication with each other, responsive to each other, or the like need not be in continuous communication with each other and need not be directly coupled to each other. Likewise, when one component is described as receiving data from or sending data to another component, that data may be sent or received through one or more intermediate components, unless expressly specified otherwise. In addition, some components of the data processing system may be implemented as adapter cards with interfaces (e.g., a connector) for communicating with a bus. Alternatively, devices or components may be implemented as embedded controllers, using components such as programmable or non-programmable logic devices or arrays, ASICs, embedded computers, smart cards, and the like. For purposes of this disclosure, the term "bus" includes pathways that may be shared by more than two devices, as well as point-to-point pathways. Also, for purpose of this disclosure, a processor may also be referred to as a processing unit, a processing element, a CPU, etc.

Also, although one or more example processes have been described with regard to particular operations performed in a particular sequence, numerous modifications could be applied to those processes to derive numerous alternative embodiments of the present invention. For example, alternative embodiments may include processes that use fewer than all of the disclosed operations, process that use additional operations, and processes in which the individual operations disclosed herein are combined, subdivided, rearranged, or otherwise altered.

In view of the wide variety of useful permutations that may be readily derived from the example embodiments described herein, this detailed description is intended to be illustrative only, and should not be taken as limiting the scope of coverage.

The following examples pertain to further embodiments.

Example A1 is a DPS with technology for booting rapidly. The DPS comprises a processor, a volatile RAM responsive to the processor, a low-speed NVM responsive to the processor, a high-speed NVM responsive to the processor, a preliminary bootcode module stored in the low-speed NVM, and a main bootcode module stored in the high-speed NVM. The high-speed NVM supports a read speed that is faster than a maximum read speed of the low-speed NVM. The preliminary bootcode module, when executed by the processor, enables the DPS to load the main bootcode module from the high-speed NVM into the RAM. The main bootcode module, when executed by the processor, enables the DPS to boot to an OS.

Example A2 is a DPS according to Example A1, wherein the high-speed NVM supports an average read speed of at least 200 megabytes per second (MB/s), and the maximum read speed of the low-speed NVM is less than 200 MB/s.

Example A3 is a DPS according to Example A2, wherein the maximum read speed of the low-speed NVM is less than 40 MB/s.

Example A4 is a DPS according to Example A1, wherein the preliminary bootcode module, when executed, enables the DPS to automatically determine, before booting the DPS to the OS, whether the main bootcode module from the high-speed NVM has good integrity. Example A4 may also include the features of any one or more of Examples A2 through A3.

Example A5 is a DPS according to Example A4, further comprising a trusted MBM measurement. Also, the operation of automatically determining whether the main bootcode module from the high-speed NVM has good integrity comprises (a) using the main bootcode module from the high-speed NVM to calculate a current MBM measurement; (b) retrieving the trusted MBM measurement; and (c) determining whether the current MBM measurement matches the trusted MBM measurement.

Example A6 is a DPS according to Example A1, wherein the preliminary bootcode module, when executed, enables the DPS to (a) automatically determine, before booting the DPS to the OS, whether the main bootcode module from the high-speed NVM has good integrity; and (b) in response to a determination that the main bootcode module from the high-speed NVM does not have good integrity, automatically use a main bootcode module from a storage device other than the high-speed NVM to boot the DPS to the OS. Example A4 may also include the features of any one or more of Examples A2 through A5.

Example A7 is a DPS according to Example A6, wherein the storage device other than the high-speed NVM comprises the low-speed NVM in the DPS.

Example A8 is a DPS according to Example A6, wherein the storage device other than the high-speed NVM comprises an external storage device.

Example A9 is a DPS according to Example A1, wherein the preliminary bootcode module, when executed, enables the DPS to (a) before using the main bootcode module to boot the DPS to the OS, use the preliminary bootcode module to automatically determine whether the main bootcode module from the high-speed NVM has good integrity; (b) in response to a determination that the main bootcode module from the high-speed NVM does not have good integrity, automatically retrieve a main bootcode module from a storage device other than the high-speed NVM; and (c) automatically replace the main bootcode module in the high-speed NVM with the main bootcode module from the storage device other than the high-speed NVM. Example A7 may also include the features of any one or more of Examples A2 through A8.

Example A10 is a DPS according to Example A9, wherein the preliminary bootcode module, when executed, enables the DPS to decompress the bootcode module from the storage device other than the high-speed NVM before automatically replacing the main bootcode module in the high-speed NVM with the main bootcode module from the storage device other than the high-speed NVM.

Example A11 is a DPS according to Example A1, wherein the preliminary bootcode module, when executed, enables the DPS to save the main bootcode module to a protected region of the high-speed NVM during an initial boot process for the DPS. Also, the operation of loading the main bootcode module from the high-speed NVM into the RAM comprises obtaining the main bootcode module from the protected region of the high-speed NVM. Example A9 may also include the features of any one or more of Examples A2 through A10.

Example A12 is a DPS according to Example A11, wherein the preliminary bootcode module, when executed, enables the DPS to (a) calculate a measurement of the main bootcode module during the initial boot process; and (b) save the measurement of the main bootcode module to a storage device other than the high-speed NVM during the initial boot process.

Example A13 is a DPS according to Example A1, wherein (a) the processor comprises a cache, at least a portion of which is able to operate as cache-as-RAM; (b) the preliminary bootcode module comprises a first portion to execute in place and a second portion to execute from the cache-as-RAM; and (c) the low-speed NVM comprises a flash memory with an SPI. Example A11 may also include the features of any one or more of Examples A2 through A12.

Example A14 is a DPS according to Example A1, wherein the preliminary bootcode module comprises MRC; and the preliminary bootcode module is configured to use the MRC to initialize the RAM before loading the main bootcode module from the high-speed NVM into the RAM. Example A12 may also include the features of any one or more of Examples A2 through A13.

Example B1 is a DPS with technology for booting rapidly. The DPS comprises a processor, a volatile RAM responsive to the processor, a low-speed NVM responsive to the processor, a high-speed NVM responsive to the processor, and a preliminary bootcode module stored in the low-speed NVM. Also, the preliminary bootcode module, when executed by the processor, enables the DPS to save a main bootcode module in the high-speed NVM during a configuration boot process. Also, the preliminary bootcode module, when executed by the processor after the main bootcode module had been saved in the high-speed NVM, enables the DPS to load the main bootcode module from the high-speed NVM into the RAM.

Example B2 is a DPS according to Example B1, wherein the main bootcode module, when executed, enables the DPS to boot to an OS.

Example B3 is a DPS according to Example B1, wherein the preliminary bootcode module, when executed, enables the DPS to automatically replace a bad main bootcode module in the high-speed NVM with a good main bootcode module during a recovery boot process. Example B3 may also include the features of Example B2.

Example C1 is a method for rapidly booting a DPS. The method comprises, during a boot process of the DPS, using a preliminary bootcode module from a low-speed NVM in the DPS to load a main bootcode module from a high-speed NVM in the DPS into a volatile RAM in the DPS, wherein the high-speed NVM supports a read speed that is faster than a maximum read speed of the low-speed NVM. The method also comprises, during the boot process, after loading the main bootcode module from the high-speed NVM into the RAM, using the main bootcode module to boot the DPS to an OS.

Example C2 is a method according to Example C1, wherein the high-speed NVM supports an average read speed of at least 200 megabytes per second (MB/s), and the maximum read speed of the low-speed NVM is less than 200 MB/s.

Example C3 is a method according to Example C2, wherein the maximum read speed of the low-speed NVM is less than 40 MB/s.

Example C4 is a method according to Example C1, further comprising, during the boot process, before using the main bootcode module to boot the DPS to the OS, using the preliminary bootcode module to automatically determine whether the main bootcode module from the high-speed NVM has good integrity. Example C4 may also include the features of any one or more of Examples C2 through C3.

Example C5 is a method according to Example C4, wherein the operation of using the preliminary bootcode module to automatically determine whether the main bootcode module from the high-speed NVM has good integrity comprises (a) using the main bootcode module from the high-speed NVM to calculate a current MBM measurement; (b) retrieving a trusted MBM measurement; and (c) determining whether the current MBM measurement matches the trusted MBM measurement.

Example C6 is a method according to Example C1, further comprising (a) before using the main bootcode module to boot the DPS to the OS, using the preliminary bootcode module to automatically determine whether the main bootcode module from the high-speed NVM has good integrity; and (b) in response to a determination that the main bootcode module from the high-speed NVM does not have good integrity, automatically using a main bootcode module from a storage device other than the high-speed NVM to boot the DPS to the OS. Example C4 may also include the features of any one or more of Examples C2 through C5.

Example C7 is a method according to Example C6, wherein the storage device other than the high-speed NVM comprises the low-speed NVM in the DPS.

Example C8 is a method according to Example C6, wherein the storage device other than the high-speed NVM comprises an external storage device.

Example C9 is a method according to Example C1, further comprising (a) before using the main bootcode module to boot the DPS to the OS, using the preliminary bootcode module to automatically determine whether the main bootcode module from the high-speed NVM has good integrity; (b) in response to a determination that the main bootcode module from the high-speed NVM does not have good integrity, automatically retrieving a main bootcode module from a storage device other than the high-speed NVM; and (c) automatically replacing the main bootcode module in the high-speed NVM with the main bootcode module from the storage device other than the high-speed NVM. Example C7 may also include the features of any one or more of Examples C2 through C8.

Example C10 is a method according to Example C9, further comprising decompressing the bootcode module from the storage device other than the high-speed NVM before automatically replacing the main bootcode module in the high-speed NVM with the main bootcode module from the storage device other than the high-speed NVM.

Example C11 is a method according to Example C1, further comprising (a) during an initial boot process for the DPS, saving the main bootcode module to a protected region of the high-speed NVM. Also, the operation of loading the main bootcode module from the high-speed NVM into the RAM comprises obtaining the main bootcode module from the protected region of the high-speed NVM. Example C9 may also include the features of any one or more of Examples C2 through C10.

Example C12 is a method according to Example C11, further comprising (a) during the initial boot process, calculating a measurement of the main bootcode module; and (b) during the initial boot process, saving the measurement of the main bootcode module to a storage device other than the high-speed NVM.

Example C13 is a method according to Example C1, wherein a first portion of the preliminary bootcode module executes in place, a second portion of the preliminary bootcode module executes from cache-as-RAM, and the low-speed NVM comprises a flash memory with a serial peripheral interface (SPI). Example C9 may also include the features of any one or more of Examples C2 through C12.

Example C14 is a method according to Example C1, wherein the preliminary bootcode module comprises memory initialization reference code (MRC), and the preliminary bootcode module uses the MRC to initialize the RAM before loading the main bootcode module from the high-speed NVM into the RAM. Example C10 may also include the features of any one or more of Examples C2 through C13.

Example D is at least one machine-accessible medium comprising computer instructions for rapidly booting a DPS. The computer instructions, in response to being executed in a DPS, enable the DPS to perform a method according to any of Examples C1 through C14.

Example E is a DPS with technology for booting rapidly. The DPS comprises a processing element, a volatile RAM responsive to the processing element, a low-speed NVM responsive to the processing element, a high-speed NVM responsive to the processing element, and computer instructions stored at least partially in the low-speed NVM. The computer instructions, when executed by the processing element, enable the DPS to perform a method according to any of Examples C1 through C14.

Example F is a DPS with technology for booting rapidly. The DPS comprises means for performing the method of any one of Examples C1 through C14.

What is claimed is:

1. A data processing system (DPS) with technology for booting rapidly, the DPS comprising:
   a processor;
   a volatile random access memory (RAM) responsive to the processor;
   a low-speed nonvolatile memory (NVM) responsive to the processor;
   a high-speed NVM responsive to the processor, wherein the high-speed NVM supports a read speed that is faster than a maximum read speed of the low-speed NVM;
   a trusted MBM measurement;
   a preliminary bootcode module stored in the low-speed NVM; and a main bootcode module stored in the high-speed NVM;
wherein the preliminary bootcode module, when executed by the processor, enables the DPS to load the main bootcode module from the high-speed NVM into the RAM;
wherein the main bootcode module, when executed by the processor in response to a loading of the main bootcode module into the RAM, enables the DPS to boot to an operating system (OS);
wherein the preliminary bootcode module, when executed, enables the DPS to automatically determine, before booting the DPS to the OS, whether the main bootcode module from the high-speed NVM has good integrity, wherein to automatically determine whether the main bootcode module from the high-speed NVM has good integrity comprises using the main bootcode module from the high-speed NVM to calculate a current MBM measurement indicative of contents of the main bootcode module, retrieving the trusted MBM measurement, and determining whether the current MBM measurement matches the trusted MBM measurement; and
wherein the preliminary bootcode module, when executed, enables the DPS to determine whether the high-speed NVM supports the read speed that is faster than the maximum read speed of the low-speed NVM; in response to a determination that the main bootcode module from the high-speed NVM does not have good integrity, to automatically retrieve a main bootcode module from a storage device other than the high-speed NVM; and, in response to a determination that the high-speed NVM supports the read speed that is faster than the maximum read speed of the low-speed NVM, to automatically replace the main bootcode module in the high-speed NVM with the main bootcode module from the storage device other than the high-speed NVM.

2. A DPS according to claim 1, wherein:
the high-speed NVM supports an average read speed of at least 200 megabytes per second (MB/s); and
the maximum read speed of the low-speed NVM is less than 200 MB/s.

3. A DPS according to claim 2, wherein the maximum read speed of the low-speed NVM is less than 40 MB/s.

4. A DPS according to claim 1, wherein the preliminary bootcode module, when executed, enables the DPS to:
in response to a determination that the main bootcode module from the high-speed NVM does not have good integrity, automatically use the main bootcode module from the storage device other than the high-speed NVM to boot the DPS to the OS.

5. A DPS according to claim 4, wherein the storage device other than the high-speed NVM comprises the low-speed NVM in the DPS.

6. A DPS according to claim 4, wherein the storage device other than the high-speed NVM comprises an external storage device.

7. A DPS according to claim 1, wherein:
the processor comprises a cache, at least a portion of which is able to operate as cache-as-RAM;
the preliminary bootcode module comprises a first portion to execute in place and a second portion to execute from the cache-as-RAM; and
the low-speed NVM comprises a flash memory with a serial peripheral interface (SPI).

8. A DPS according to claim 1, wherein:
the preliminary bootcode module comprises memory initialization reference code (MRC); and
the preliminary bootcode module is configured to use the MRC to initialize the RAM before loading the main bootcode module from the high-speed NVM into the RAM.

9. A data processing system (DPS) with technology for booting rapidly, the DPS comprising:
a processor;
a volatile random access memory (RAM) responsive to the processor;
a low-speed nonvolatile memory (NVM) responsive to the processor;
a high-speed NVM responsive to the processor; and
a preliminary bootcode module stored in the low-speed NVM;
wherein the preliminary bootcode module, when executed by the processor, enables the DPS to (i) determine whether the high-speed NVM supports a read speed that is faster than a maximum read speed of the low-speed NVM, (ii) in response to a determination that the high-speed NVM supports the read speed that is faster than the maximum read speed of the low-speed NVM, save a main bootcode module in the high-speed NVM during a configuration boot process, (iii) calculate a trusted MBM measurement indicative of contents of the main bootcode module during the configuration boot process, and (iv) save the trusted MBM measurement during the configuration boot process; and
wherein the preliminary bootcode module, when executed by the processor after the main bootcode module had been saved in the high-speed NVM, enables the DPS to load the main bootcode module from the high-speed NVM into the RAM.

10. A DPS according to claim 9, wherein the main bootcode module, when executed, enables the DPS to boot to an operating system (OS).

11. A DPS according to claim 9, wherein the preliminary bootcode module, when executed, enables the DPS to automatically replace a bad main bootcode module in the high-speed NVM with a good main bootcode module during a recovery boot process.

12. A method for rapidly booting a data processing system, the method comprising:
during a boot process of a data processing system (DPS), using a preliminary bootcode module from a low-speed nonvolatile memory (NVM) in the DPS to load a main bootcode module from a high-speed NVM in the DPS into a volatile random access memory (RAM) in the DPS, wherein the high-speed NVM supports a read speed that is faster than a maximum read speed of the low-speed NVM;
during the boot process, using the preliminary bootcode module to calculate a current MBM measurement indicative of contents of the main bootcode module loaded in the volatile RAM, retrieving a trusted MBM measurement, and determining whether the current MBM measurement matches the trusted MBM measurement;
during the boot process, after loading the main bootcode module from the high-speed NVM into the RAM and determining that the current MBM measurement matches the trusted MBM measurement, using the main bootcode module to boot the DPS to an operating system (OS);
during the boot process, after determining that the current MBM measurement does not match the trusted MBM measurement, using the preliminary bootcode module to determine whether the high-speed NVM supports the read speed that is faster than the maximum read speed of the low-speed NVM; and during the boot process, after determining that the high-speed NVM supports the read speed that is faster than the maximum read speed of the low-speed NVM, using the preliminary bootcode module to automatically replace the main bootcode module in the high-speed NVM with the main bootcode module from the storage device other than the high-speed NVM.

13. A method according to claim 12, wherein:
the high-speed NVM supports an average read speed of at least 200 megabytes per second (MB/s); and
the maximum read speed of the low-speed NVM is less than 200 MB/s.

14. A method according to claim 13, wherein the maximum read speed of the low-speed NVM is less than 40 MB/s.

15. A method according to claim 12, further comprising:
during the boot process, before using the main bootcode module to boot the DPS to the OS, using the preliminary bootcode module to automatically determine whether the main bootcode module from the high-speed NVM has good integrity.

16. A method according to claim 12, further comprising:
before using the main bootcode module to boot the DPS to the OS, using the preliminary bootcode module to automatically determine whether the main bootcode module from the high-speed NVM has good integrity; and
in response to a determination that the main bootcode module from the high-speed NVM does not have good integrity, automatically using the main bootcode module from the storage device other than the high-speed NVM to boot the DPS to the OS.

17. A method according to claim 16, wherein the storage device other than the high-speed NVM comprises the low-speed NVM in the DPS.

18. A method according to claim 16, wherein the storage device other than the high-speed NVM comprises an external storage device.

19. A method according to claim 16, further comprising:
decompressing the bootcode module from the storage device other than the high-speed NVM before automatically replacing the main bootcode module in the high-speed NVM with the main bootcode module from the storage device other than the high-speed NVM.

20. A method according to claim 12, further comprising:
during an initial boot process for the DPS, saving the main bootcode module to a protected region of the high-speed NVM; and
wherein the operation of loading the main bootcode module from the high-speed NVM into the RAM comprises obtaining the main bootcode module from the protected region of the high-speed NVM.

21. A method according to claim 20, further comprising:
during the initial boot process, calculating the trusted MBM measurement, wherein the trusted MBM measurement is indicative of contents of the main bootcode module; and
during the initial boot process, saving the trusted MBM measurement to a storage device other than the high-speed NVM.

* * * * *